May 6, 1952  R. E. MALLORY  2,595,685
INFANT MILK BOTTLE AND FOOD WARMER
Filed April 25, 1949

INVENTOR.
Robert E. Mallory
BY
ATTORNEY

Patented May 6, 1952

2,595,685

UNITED STATES PATENT OFFICE 2,595,685

INFANT MILK BOTTLE AND FOOD WARMER

Robert E. Mallory, Oklahoma City, Okla.

Application April 25, 1949, Serial No. 89,395

3 Claims. (Cl. 257—208)

This invention relates to heaters or warming devices for relatively small articles such as baby bottles or other receptacles such as cans of food, the primary object being to provide structure adaptable to receive a flow of pressurized heated liquid and to channel such liquid over the surface of the article to be warmed, all to the end that a simple, relatively rapid, heating operation can take place without the necessity of the use of a stove or other heating means.

It is the most important object of the present invention to provide a receptacle heater constituting an open top, hollow body adapted to receive the article to be heated and so formed as to receive hot water under pressure at one end thereof, whereby the water impinges upon and flows along the outermost surface of said article to the end that the temperature of the contents of the receptacle is raised.

A further object of the present invention is to provide a heater as above set forth having overflow means near the open top thereof and a shell circumscribing the outermost surface of the heater itself for directing the over-flowing water downwardly against the outer surface of the main body portion of the heater.

Another important object lies in the way in which the aforesaid heater is provided with a false perforated bottom for supporting the receptacle to be heated and the manner in which such receptacle is held above the surface of such partition, to the end that the flowing water impinges upon the bottom of such receptacle.

Many more minor objects will be made clear or become apparent as the following specification progresses, reference being had to the accompanying drawing, wherein.

Figure 1:
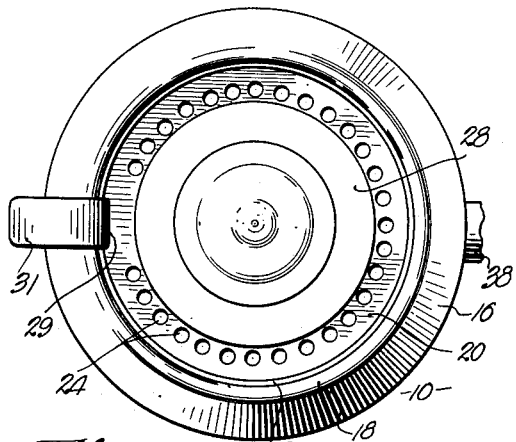
Fig. 1 is a top plan view of an infant's milk bottle and food warmer made in accordance with my present invention.

In the drawing, a hollow container, broadly designated by the numeral 10, has an open top and an open bottom, and a side wall 14 that is preferably circular in cross-section as indicated, but obviously the shape thereof is immaterial to the present invention. A removable cap 12, closing the bottom of container 10 is held in place by frictional engagement with wall 14 or by other means of releasable attachment thereto.

The side wall 14 of the container 10 is rebent upon itself at its uppermost edge to present a circumscribing skirt 16 that extends downwardly and terminates in an open bottom in spaced relationship above the cap 12. This refolding of the skirt 16 presents a smooth rounded line of bend 18, that defines the uppermost, open end of the container 10.

It is to be noted that the skirt 16 is frusto-conical and that the walls thereof diverge from the wall 14 of container 10 as the lowermost end of skirt 16 is approached.

A cup-shaped false bottom within the container 10 has its up-turned side wall 21 in slidable, frictionable engagement with wall 14 and normally rests upon an in-turned lug 22 secured in any suitable manner directly to the innermost face of wall 14 near the lowermost end thereof. Thus, the false bottom 20 may be entirely removed as desired to permit cleaning of the interior of container 10.

False bottom 20 is provided with a plurality of perforations 24 and a number of upstanding bosses 26 for holding a bottle or other receptacle 28 in spaced relationship above the uppermost surface of bottom 20. In the instance illustrated, the receptacle 28 constitutes a conventional baby bottle, but it is appreciated that other receptacles might be accommodated by the container 10, having contents differing from milk or water to be heated.

Figure 2:
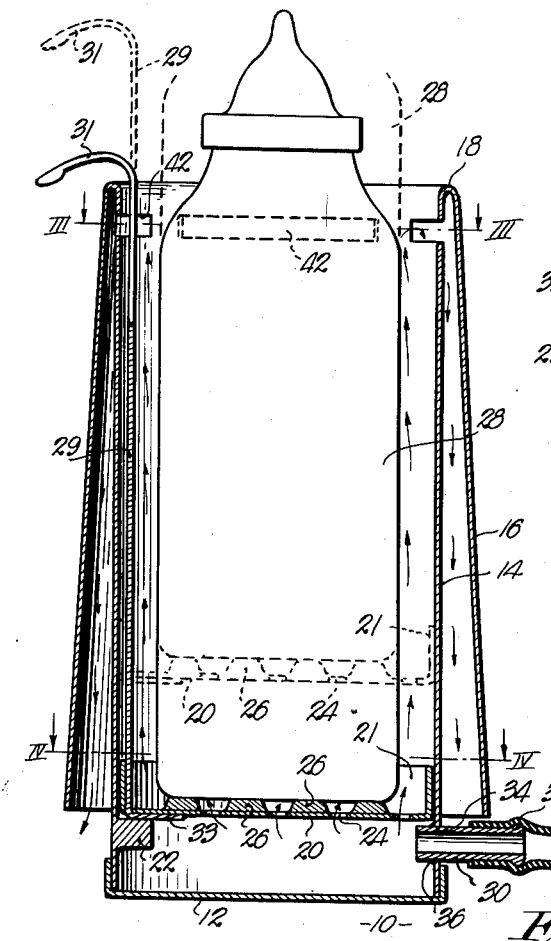
Fig. 2 is a substantially central vertical cross-sectional view taken through the warmer shown in Fig. 1.
Figure 4:
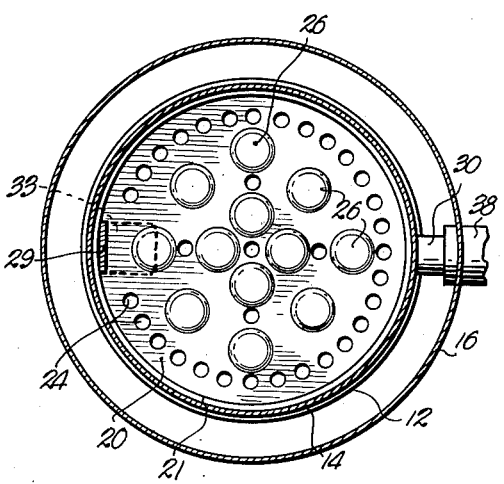
Fig. 4 is a transverse cross-sectional view taken on line IV—IV of Fig. 2 with the receptacle to be heated removed.

To this end, and particularly when receptacles other than baby bottles are to be heated, and of such nature having a lesser height, a bail 29 is provided for false bottom 20. Bail 29 has a laterally extending finger grip 31 at its uppermost end and extends through bottom 20 at its lowermost end as shown in Fig. 2. A projection 33 extending oppositely to grip 31 underlies bottom 20.

Thus, through bail 29, bottom 20 may be positioned at any selected point within container 10 as shown by dotted lines in Fig. 2, and short receptacles to be heated may be raised, lowered and removed as desired.

In lieu of bail 29, a chain may be used and secured in a suitable hook adjacent top rim 18 to positively hold bottom 20 spaced above lug 22.

Figure 3:
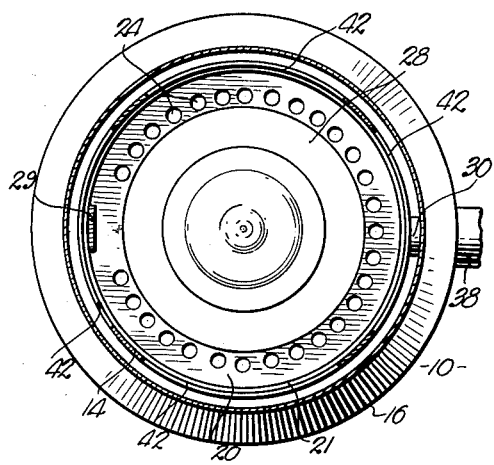
Fig. 3 is a transverse cross-sectional view taken on line III—III of Fig. 2.

As shown in Figs. 1 to 3 inclusive, the inside diameter of the container 10 is appreciably greater than the outside diameter of the bottle 28, all to the end that a space is provided between the proximal walls of receptacle 28 and container 10. A short tube 30 having external ribs 32 thereon extends into an opening 34 formed in the wall 14 of container 10 between bottoms 12 and 20 thereof. This tube 30 is secured in place in any suitable fashion as by solder 36 and is adapted to receive a hose or like conduit 38 having connection with a source of heated water or other liquid not shown. The ribs 32 on the pipe 30 serve to removably hold the proximal end of hose 38 in tight circumscribed relationship to pipe 30.

A plurality of over-flow openings 42 are provided in the wall 14 just below the uppermost edge 18 of container 10 for placing the interior of container 10 in direct registering relationship with the space between shell 16 and the outer face of wall 14.

In use, the heater is placed above a suitable drain or catch basin and the hose 38 is connected to a source of heated water under pressure. Such pressurized liquid will enter the container 10 through pipe 30 below the false bottom 20 and will be directed upwardly with force through the perforations 24 of bottom 20. This water will impinge upon and flow along not only the bottom wall of the receptacle 28 but along all sides thereof. This continuously flowing water will thereupon over-flow through the openings 42 and be channeled downwardly as indicated by arrows in Fig. 2 along the outermost face of wall 14 of container 10.

Obviously, this system of heating the contents of the receptacle 28, differs from merely setting the latter within a container of heated water because of the fact that through this structure, there is a continuous flow of hot water about the receptacle 28 and the contents thereof will be quickly heated and require but a small amount of hot water to accomplish such desired result. No splashing whatsoever will occur as the water over-flows through the openings 42 because of the over-hanging skirt 16 and furthermore, the water that flows downwardly between the walls 14 and 16 will impinge upon the outermost face of wall 14 and further aid in maintaining the upwardly flowing water within container 10 in a heated condition.

It is to be appreciated further that breakage of receptacles 28 when made from glass or the like, can easily be eliminated by first filling the container 10 with relatively cool water, whereupon, as the hot water enters through pipe 30, a gradual heating of receptacle 28 will occur.

It is to be seen that the entire heater can be made relatively light, small and compact and that the cost of manufacture thereof will be extremely small. These features and many others will become apparent to those experienced in this field and while only one form of my present invention has been illustrated and described, it is manifest that many changes and modifications may be made. Accordingly, it is desired to be limited only by the spirit of this invention as defined by the scope of the appended claims.

Having thus described my invention, what is claimed as new and desired to be secured by Letters Patent is:

1. An article heater comprising an open top, article-receiving container having a side wall and a bottom wall; a skirt having an outlet opening, said skirt circumscribing the side wall in spaced relationship thereto, the upper ends of the wall and the skirt respectively being interconnected throughout the lengths thereof; means for directing a heated liquid under pressure into the container; liquid overflow openings formed in the container near said upper end thereof in register with the space between the wall and the skirt; a perforated article support in the container spaced above said bottom wall, said means being below the support; and means mounting the support for selective positioning in the container at variable distances above the bottom wall.

2. An article heater comprising an open top, article-receiving container having a side wall and a bottom wall; a skirt having an outlet opening, said skirt circumscribing the side wall in spaced relationship thereto, the upper ends of the wall and the skirt respectively being interconnected throughout the lengths thereof; means for directing a heated liquid under pressure into the container; liquid overflow openings formed in the container near said upper end thereof in register with the space between the wall and the skirt; and a perforated article support in the container spaced above said bottom wall, said means being below the support, the diameter of said article support being substantially the same as the inside diameter of said container, the support being in sliding frictional engagement with the side wall of said container whereby the support may be selectively positioned in the container at variable distances above the bottom wall.

3. An article heater comprising an open top, article-receiving container having a side wall and a bottom wall; a skirt having an outlet opening, said skirt circumscribing the side wall in spaced relationship thereto, the upper ends of the wall and the skirt respectively being interconnected throughout the lengths thereof; means for directing a heated liquid under pressure into the container; liquid overflow openings formed in the container near said upper end thereof in register with the space between the wall and the skirt; a perforated article support in the container spaced above said bottom wall, said means being below the support, the diameter of said article support being substantially the same as the inside diameter of said container, the support being in sliding frictional engagement with the side wall of said container whereby the support may be selectively positioned in the container at variable distances above the bottom wall; and an elongated bail within the container and having the lowermost end thereof connected with said support and provided with a finger grip at the uppermost end thereof above the uppermost end of the container for sliding the support in the container to vary the position thereof with respect to said bottom wall.

ROBERT E. MALLORY.

REFERENCES CITED

The following references are of record in the file of this patent:

UNITED STATES PATENTS

| Number | Name | Date |
| --- | --- | --- |
| 1,618,735 | Storey | Feb. 22, 1927 |
| 1,785,438 | Edlin | Dec. 16, 1930 |
| 1,850,500 | Goble | Mar. 22, 1932 |
| 1,860,302 | Thomas | May 24, 1932 |
| 2,166,753 | Derleth | July 18, 1939 |
| 2,275,705 | Wagner | Mar. 10, 1942 |